(12) United States Patent
Lassiter (10) Patent No.: US 9,697,720 B1
(45) Date of Patent: Jul. 4, 2017

(54) MULTIFUNCTIONAL PERSONAL EMERGENCY SAFETY DEVICE

(71) Applicant: Jason L. Lassiter, Blue Springs, MO (US)

(72) Inventor: Jason L. Lassiter, Blue Springs, MO (US)

( * ) Notice: Subject to any disclaimer, the term of this patent is extended or adjusted under 35 U.S.C. 154(b) by 0 days.

(21) Appl. No.: 14/999,213

(22) Filed: Apr. 11, 2016

(51) Int. Cl.
```
G08B 25/01      (2006.01)
H04W 4/02       (2009.01)
H04W 4/22       (2009.01)
H04M 1/725      (2006.01)
H04M 1/02       (2006.01)
H04N 5/91       (2006.01)
H04N 5/77       (2006.01)
A44B 11/00      (2006.01)
A44B 11/20      (2006.01)
A44B 11/16      (2006.01)
```

(52) U.S. Cl.
CPC ......... *G08B 25/016* (2013.01); *A44B 11/005* (2013.01); *A44B 11/16* (2013.01); *A44B 11/20* (2013.01); *H04M 1/0264* (2013.01); *H04M 1/72541* (2013.01); *H04M 1/72572* (2013.01); *H04N 5/77* (2013.01); *H04N 5/91* (2013.01); *H04W 4/02* (2013.01); *H04W 4/22* (2013.01)

(58) Field of Classification Search
CPC ...... G08B 25/016; A44B 11/005; A44B 11/16

USPC ................ 386/200, 358, 362; 348/158, 373; 455/347, 404.2, 456.1, 550.1; 224/255
See application file for complete search history.

(56) References Cited

U.S. PATENT DOCUMENTS

| | | | | |
|---|---|---|---|---|
| 3,305,148 | A * | 2/1967 | Zimmerman | A45F 5/00 224/255 |
| D684,500 | S | 6/2013 | Lassiter | |
| 2004/0053637 | A1* | 3/2004 | Iida | H04N 1/00127 455/550.1 |
| 2005/0024884 | A1* | 2/2005 | Seminara | A41D 13/01 362/473 |
| 2007/0273786 | A1* | 11/2007 | Ahn | G03B 17/00 348/373 |
| 2010/0330952 | A1* | 12/2010 | Yeoman | H04M 1/72541 455/404.2 |
| 2016/0182850 | A1* | 6/2016 | Thompson | H04N 9/8205 348/158 |
| 2016/0232770 | A1* | 8/2016 | Davis | G08B 15/02 |
| 2016/0373622 | A1* | 12/2016 | Xu | H04N 5/2252 |

FOREIGN PATENT DOCUMENTS

| | | | |
|---|---|---|---|
| CN | 104780305 | * | 7/2015 |
| CN | 205597305 | * | 9/2016 |

* cited by examiner

*Primary Examiner* — Mishawn Hunter
(74) *Attorney, Agent, or Firm* — John L. James (57) ABSTRACT

A personal emergency safety device operates with the push of a button to warn of an emergency problem situation. The device is discretely configured as a belt buckle that calls up to three numbers with the push of a single button and provides location information as well as audio and video recording.

12 Claims, 11 Drawing Sheets

MULTIFUNCTIONAL PERSONAL EMERGENCY SAFETY DEVICE

TECHNICAL FIELD OF THE INVENTION

This invention pertains generally emergency safety devices, and, more particularly, to a personal emergency safety device that operates with the push of a button to warn of an emergency problem situation.

BACKGROUND OF THE INVENTION

Each year, millions of people are affected by crime either directly as a victim or indirectly. Loss of resources or reallocation of resources due to crime are indirect cost everyone bears. When a person falls victim to crime, not only may there be direct physical effects, such as bodily injury, but psychological effects also, which may be long lasting and more devastating than physical injury. Fear is a psychological effect that is particularly devastating because it may detrimentally and irreversibly affect a person. Accordingly, it will be appreciated that it would be highly desirable to have a personal emergency safety device that could summon help for a person when disposed in a frightening situation.

One type or crime that seemingly is growing is persons impersonating law enforcement officers. When driving alone at night, people are advised to drive to a public place rather than stop on a dark or secluded stretch of road when there is doubt about the authenticity of a policeman who is pulling them over. It is desirable to have a device that a driver could use to alert a legitimate official or friend while the incident is occurring. It is also desirous to have a device that can discretely record the incident and any conversation that takes place.

A growing crime today is bullying of young children. Usually, a bully does not want public attention; rather the bully wants attention from a few friends. It will be appreciated that it would be highly desirable to have a device that issues a loud sound to discourage the bully and alert others of the situation. It is also desirable to have a device that discretely records a bullying incident and contacts a person of authority.

Child molestation is of national concern, so much so that a convicted child molester is required to register with local law enforcement as a sex offender so that interested persons can know where the offender lives. Even so, children are too often preyed upon while walking to and from school, walking to the school bus stop, or walking to a school function. Some offenders try to lure children with candy, pets or toys. It is therefore desirable to have a discreet device that alerts a designated person of a problem situation and provides audio and video recording. It is also highly desirable to have a device that can sound an alarm to discourage potential offenders and alert others of the situation.

SUMMARY OF THE INVENTION

The present invention is directed to overcoming one or more of the problems set forth above. Briefly summarized, according to one aspect of the present invention, a personal safety device comprises a housing, a circuit board disposed in the housing, a power button attached to the circuit board and protruding through an opening of the housing, and panic button attached to the circuit board and protruding through another opening of the housing.

According to another aspect of the invention, a personal safety device comprises: a housing having front and rear housing members with the front housing member having a top edge portion with a plurality of openings therein, a bottom edge portion, and a front face with a plurality of openings therein disposed between the top and bottom edge portions, and with the rear housing member having top and bottom edge portions, left and right edge portions and a rear face. A circuit board is disposed in the housing and attached to the front housing member.

A first buckle member has a first portion, an intermediate portion and a third portion. The first portion is fastened to the rear face of the rear housing member and has a distal end portion, and the intermediate portion has one end pivotally connected to the distal end portion. The intermediate portion forms an opening with a hook therein adapted to grab and hold the first end portion of a belt. The third end portion of the first buckle member is pivotally connected to the intermediate portion with the third portion forming a loop adapted to hold the second end portion of the belt.

A second buckle member has a first, intermediate and third loop portions attached to the rear face adapted to receive the belt therethrough. The first loop portion has a first spring and a thumb latch attached thereto adapted to hold and release the belt in response to moving the thumb latch. The intermediate loop portion has a vertical spring member therein adapted to bias the first spring toward the belt.

A panic button is attached to the circuit board and protrudes through a third opening of the plurality of openings in the front face portion of the front housing member. A record button is attached to the circuit board and protrudes through a first opening of the plurality of openings in the top edge portion of the front housing member.

A panic button is attached to the circuit board and protrudes through a third opening of the plurality of openings in the front face portion of the front housing member. A record button is attached to the circuit board and protrudes through a first opening of the plurality of openings in the top edge portion of the front housing member.

A speaker is attached to one of the circuit board and front housing member and is disposed to project sound through a fourth opening of the plurality of openings in the front face of the front housing member. Slats extend laterally across the fourth opening of the front face forming a baffle.

The circuit board contains a GPS module, a communications module, a camera, a microphone, memory, and a micro-controller unit coordinating operation of the GPS and, communications modules, camera and microphone, so that depressing the panic button signals the micro-controller unit to automatically activate the GPS and communications modules, camera and microphone.

An objective of the invention is to provide a device that could summon help for a person disposed in a frightening situation. This object is achieved by the personal emergency safety device of the present invention. A feature of the invention is a panic button which, when depressed, calls up to three numbers to summon help.

Another object of the invention is to provide a device that a driver could use to alert a legitimate official or friend while an incident is occurring. This object is achieved by the personal emergency safety device of the present invention. A feature of the invention is a panic button which, when depressed, calls up to three numbers to summon help. In addition, when depressed, the panic button discretely audio and video record the incident and any conversation that takes place.

Another object of the invention is to provide a device that discourages a bully. This object is achieved with a siren button which, when depressed, initiates a loud sound to discourage the bully and alert others of the situation. A feature of the invention is that it can also discretely records a bullying incident and contacts a person of authority.

These and other aspects, objects, features and advantages of the present invention will be more clearly understood and appreciated from a review of the following detailed description of the preferred embodiments and appended claims, and by reference to the accompanying drawing figures.

DETAILED DESCRIPTION OF THE PREFERRED EMBODIMENTS

Figure 1:
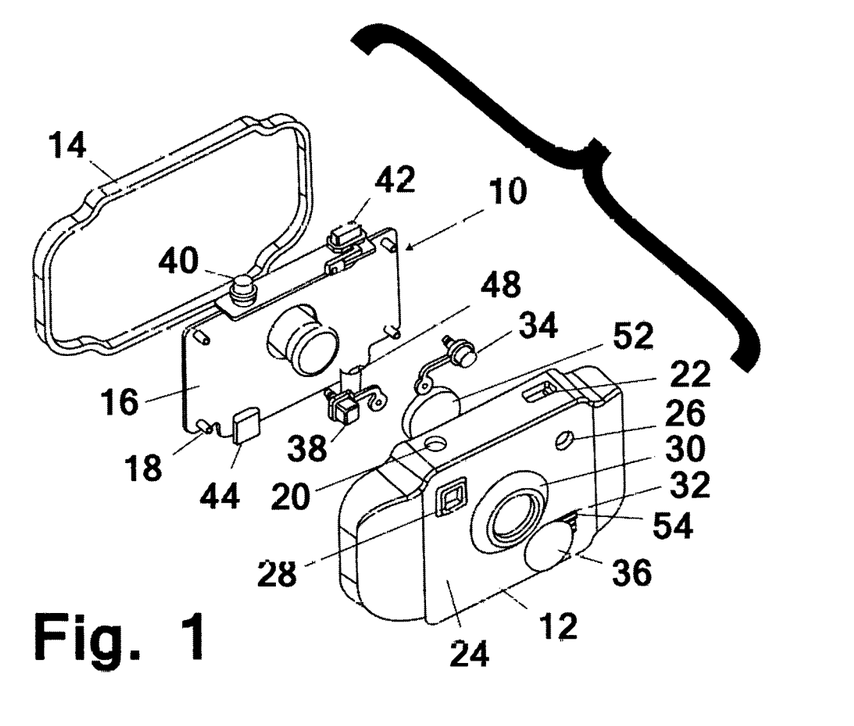
FIG. 1 is an exploded view of a preferred embodiment of a personal emergency safety device according to the present invention.
Figure 2:
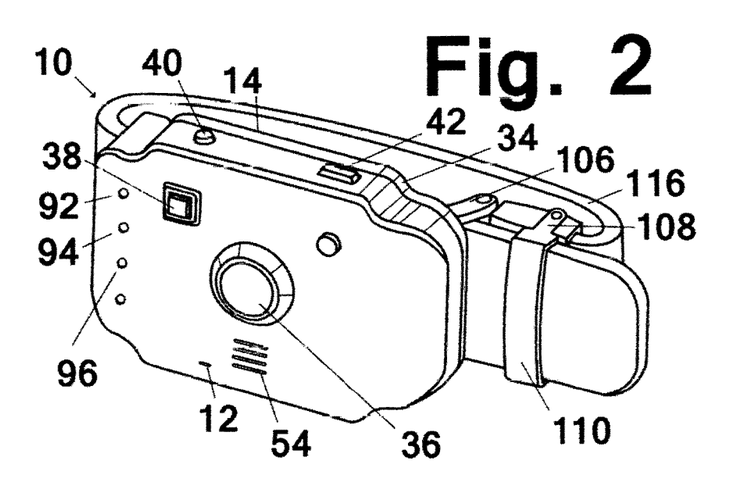
FIG. 2 is a front perspective view of a preferred embodiment of a personal emergency safety device with a belt attached according to the present invention.
Figure 3:
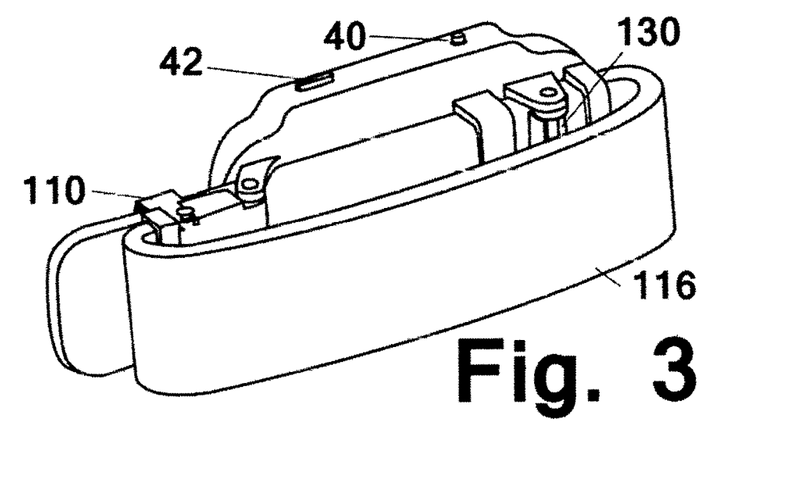
FIG. 3 is a diagrammatic rear perspective view of the safety device of FIG. 2.
Figure 4:
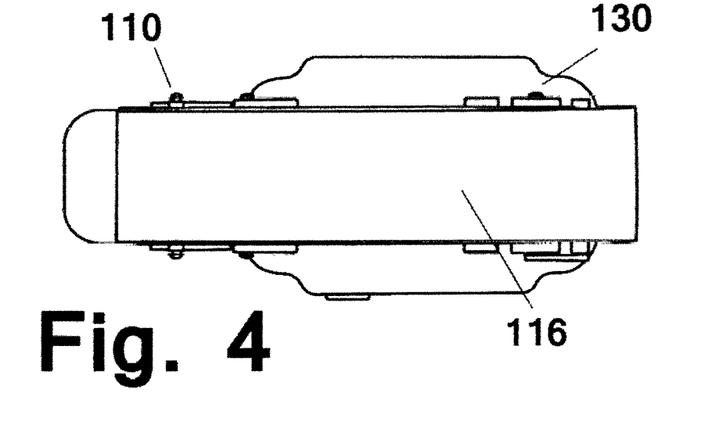
FIG. 4 is a diagrammatic rear view of the safety device of FIG. 2.
Figure 5:
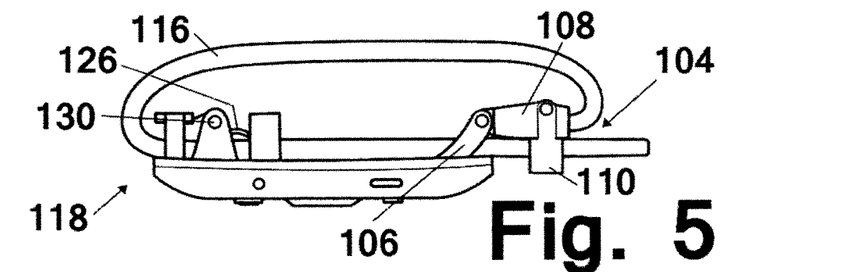
FIG. 5 is a diagrammatic top view of the safety device of FIG. 2.
Figure 6:
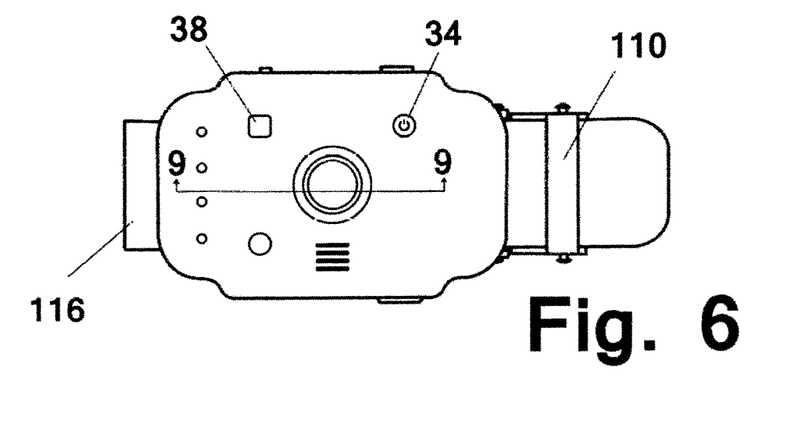
FIG. 6 is a diagrammatic front view of the safety device of FIG. 2.

Referring to FIG. 1, a personal safety device 10 has front and rear housing members 12, 14, and a circuit board 16 disposed in the housing and attached to the front housing member, preferably with screws 18 or the like. The front housing member 12 has a top edge portion with a plurality of openings therein 20, 22, and a bottom edge portion with a plurality of openings therein. A front face 24 is disposed between the top and bottom edge portions and has a plurality of openings 26, 28, 30 32 therein.

A power button 34 is attached to the circuit board 16 and protrudes through the first opening 26 of the plurality of openings in the front face 24 of the front housing member 12. When depressed, power button 34 causes power to be applied for operation of various modules and functions of the device; however, certain modules and functions can be energized by other means as explained herein.

A lens 36 is disposed in the second opening 30 of the plurality of openings in the front face portion 24 of the front housing member 12. Lens 36 is used for video recording and camera functions.

A panic button 38 is attached to the circuit board 16 and protrudes through the third opening 28 of the plurality of openings in the front face portion 24 of the front housing member 12. Depressing panic button 38 automatically enables the Wifi module to sequentially call three programmed numbers and GPS function to provide location information. Depressing panic button 38 automatically enable audio and video recording functions as well. Panic button 38 performs these functions without regard to the status of power button 34. The panic button causing data to be stored in memory for later retrieval can be likened to the black box on an airplane because it causes audio and video to be recorded and stored in memory that can be retrieved to identify what has occurred.

A record button 40 is attached to the circuit board 16 and protrudes through the first opening 20 of the plurality of openings in the top edge portion of the front housing member 12. Record button 40 enables audio and video recording functions without regard to the status of the power button 34. Audio and video can be stored on removable flash memory or stored internally for later playback.

A GPS button 42 is attached to the circuit board 16 and protrudes through the second opening 22 of the plurality of openings in the top edge portion of the front housing member 12. When depressed, GPS button 42 provides location information without regard to the status of power button 34. This function is useful to learn the whereabouts of a person with the device. For example, a child on his way to or from school or on a particular errand can be monitored.

Figure 7:
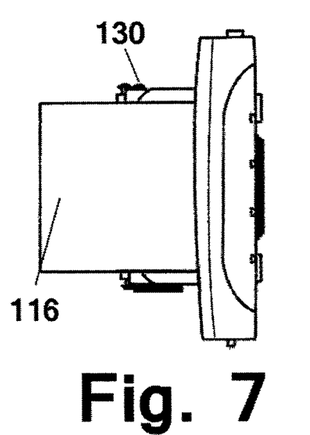
FIG. 7 is a diagrammatic left end view of the safety device of FIG. 2.
Figure 8:
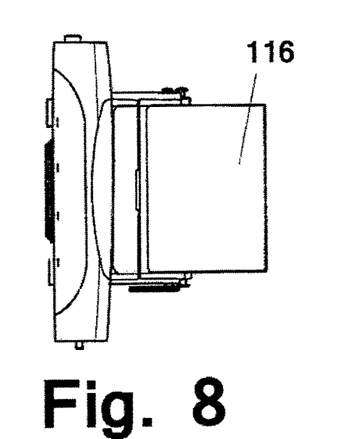
FIG. 8 a diagrammatic right end view of the safety device of FIG. 2.
Figure 9:
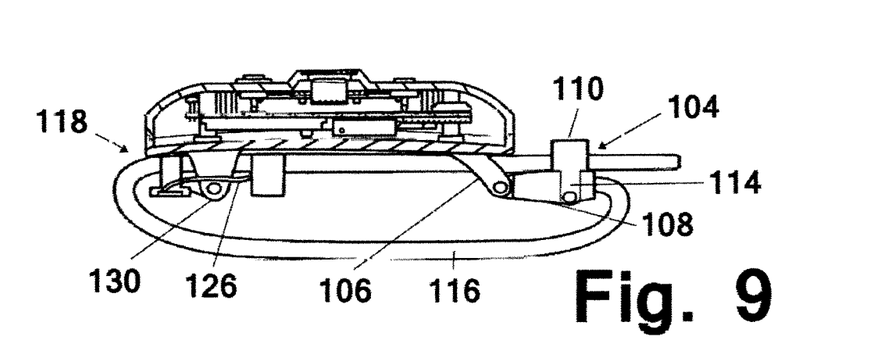
FIG. 9 is a sectional view taken along line 9-9 of FIG. 6.
Figure 10:
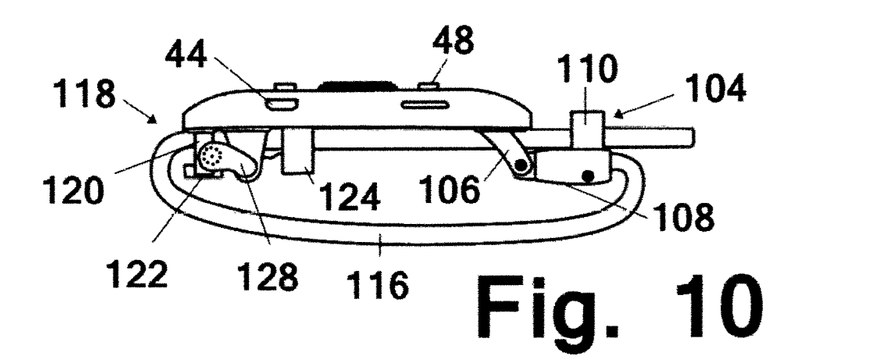
FIG. 10 is a diagrammatic bottom view of the safety device of FIG. 2.

Referring to FIGS. 1 and 7, the bottom edge portion of the front housing member 12 has a plurality of openings therein. A USB port 44 is attached to the circuit board 16 and is accessible through the first opening 46 of the plurality of openings in the bottom edge portion of the front housing member. USB port 44 can be used to charge the battery as needed.

A dc jack 48 is attached to the circuit board 16 and is accessible through the second opening 50 of the plurality of openings in the bottom edge portion of the front housing member. The device can be powered via dc jack 48 when connected, otherwise, the device is battery operated and power button 40 turns the device off and on as needed.

A speaker 52 is attached to one of the circuit board 16 and front housing member 12 and is disposed to project sound through the fourth opening 32 of the plurality of openings in the front face of the front housing member. A plurality of slats 54 extend laterally across the fourth opening 32 of the front face forming a baffle.

Figure 11:
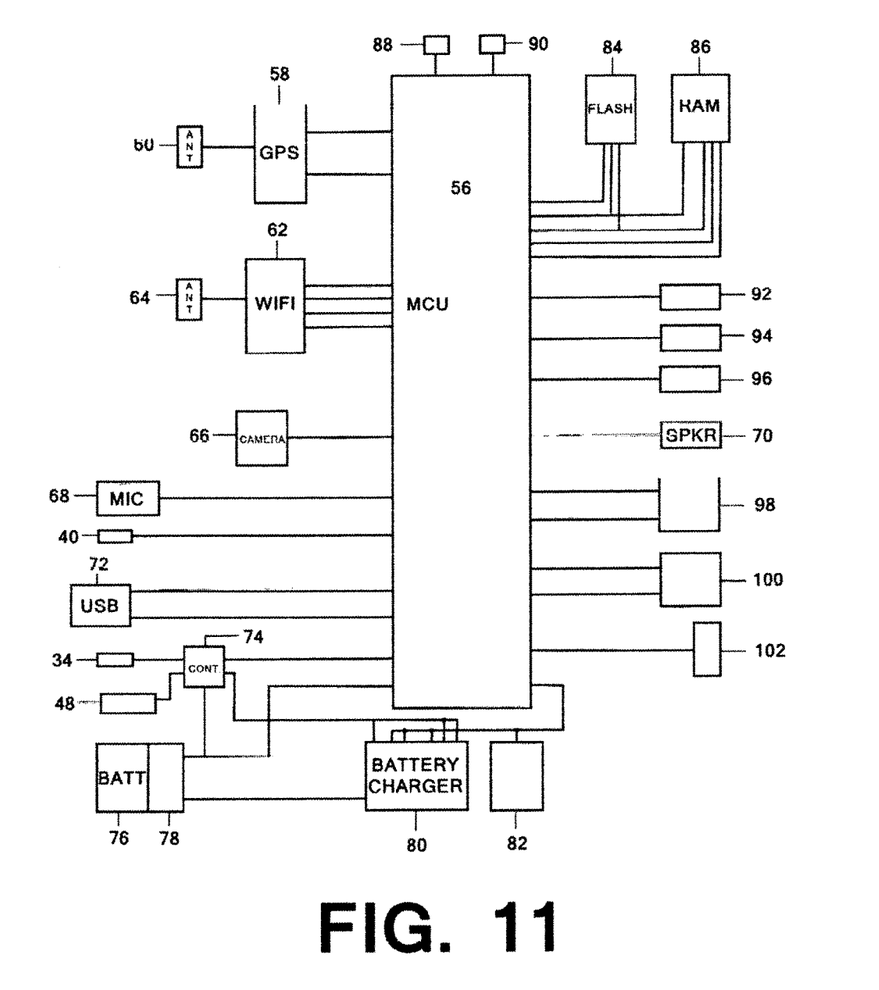
FIG. 11 is a block diagram illustrating functional components for supporting functions of the safety devices of FIGS. 1 and 2.

Referring now to FIG. 11, circuit board 16 contains a central microcontroller (MCU), such as an STM32F400 series microcontroller 56, for example. MCU 56 controls GPS module 58 which has an antenna 60 for wireless transmission of location data. MCU 56 controls wifi module 62 which also has an antenna 64 for wireless communication. Also controlled by MCU 56 are a camera module 66, a microphone 68 and a speaker 70. USB port 44 communicates with MCU 56 via a USB communications module 72. Power for the device arrives via USB module 72 and via dc jack 48. These and other components are commonly used in telephony and communications and are well known in the art.

An on/off power controller, such as an LTC2955 power controller 74, for example, can respond to power button 34 to power the device. When an adapter is plugged in to dc jack 48 controller 74 can control power flow from the external source. The device can be powered by a lithium ion battery 76 with an appropriate protection circuit 78. Battery 76 is kept charged by battery charger 80, such as linear USB battery charger LTC3558, for example. A linear regulator 82, such as an LT3020 for example, helps to regulate voltage levels.

The device uses removable memory such as flash memory 84 and RAM memory 86. As configured, a real time clock 88 operates at 32 Khz while system clock 90 operates faster at 8 Mhz. The device can be equipped with three LED's 92, 94, 96 to indicate battery condition. As configured, the device contains modules 98, 100, 102 for debugging and programming functions.

It is anticipated that the device will be programmed to call three numbers one at a time. If there is no response at the first programmed number, a second programmed number will be called. If there is no response at the first two numbers, a third number will be called. One of called numbers can be a parent, guardian or person of authority while another can be a friend. One of the three numbers should be a 911 emergency number or a private emergency call center.

Referring now to FIGS. 2-10, a first buckle member 104 has a first portion 106, an intermediate portion 108 and a third portion 110. First buckle member portion 106 is fastened to the face of the rear housing member 14 and has a distal end portion spaced from housing member 14. The intermediate portion 108 has one end pivotally connected to the distal end portion of the first portion 106 of the first buckle member 104 and defines an opening with a hook 114 therein adapted to grab and hold fast the first end portion of a belt 116. The third end portion 110 is pivotally connected to intermediate portion 108 and forms a loop adapted to hold the second end portion of belt 116.

A second buckle member 118 has a first portion 120, an intermediate portion 122 and a third portion 124 portions attached to the face of rear housing member 14 forming loops adapted to receive belt 116 therethrough. The first loop portion 120 has a first spring 126 and a thumb latch 128 attached thereto adapted to hold and release the belt in response to moving the thumb latch 128. The intermediate loop portion 122 has vertical spring member 130 therein adapted to bias first spring 126 toward belt 116 to hold belt at a desired length.

Depending on the particular components used, the device can be thin like a cellular telephone and much smaller because it does not need a viewing screen or key board. So, at this time, the buckle need not be larger than belt buckles typically worn today and may be only slightly larger than military buckles used with web belts.

Operation of the present invention is believed to be apparent from the foregoing description and drawings, a few words will be added for emphasis. One end of a belt is fastened to the buckle and the belt is placed around the waist of the user. The distal end of the belt is slid through the buckle and the belt is adjusted to fit. When an emergency does not exist, a person can use the camera functions to record scenes and activity in real time. Sound recordings can also be made in real time. Similarly using the GPS button alone provides position information to be communicated to a person via the Wifi communications module. When an emergency condition exists, a person wearing the belt simply presses the panic button and automatically initiates audio and video recording, starts the programmed numbers dialing. The panic button enables all functions of the device.

It can now be appreciated that a personal emergency safety device has been presented that operates with the push of a single button to warn of an emergency problem situation. The device can be configured to be worn on the wrist or hanging from the neck as a pendant, but is best used ds a discreet belt buckle. The device can be programmed to automatically call as many as three numbers with the calling sequence terminating when a called party answers. The programmed numbers can be parents, friends, a 911 emergency call center or other call center. Depressing the panic button automatically initiates the calling sequence and simultaneously enables audio and video recording.

Figure 12:
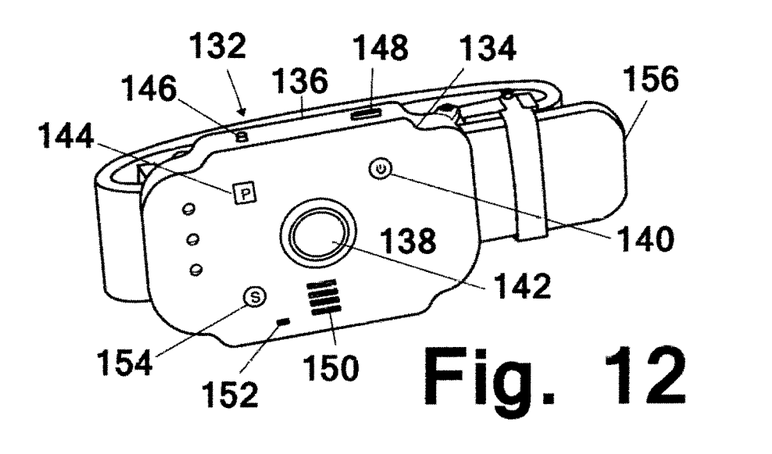
FIG. 12 is a front perspective view of another preferred embodiment of a personal emergency safety device with a siren according to the present invention.

Referring now to FIG. 12, another preferred embodiment of a personal emergency safety device is presented The device is fashioned as a belt buckle for attaching to a belt 156. Personal safety device 132 has front and rear housing members 134, 136, and a circuit board with operational modules and circuitry disposed in the housing and attached to the front housing member. The front housing member 134 has a top edge portion with a plurality of openings therein and a bottom edge portion with a plurality of openings therein. A front face 138 is disposed between the top and bottom edge portions and has a plurality of openings therein.

A power button 140 is attached to the circuit board and protrudes through the first opening of the plurality of openings in the front face 138 of the front housing member 134. A lens 142 is disposed in the second opening of the plurality of openings in the front face portion 138 of the front housing member 134. A panic button 144 is attached to the circuit board and protrudes through the third opening of the plurality of openings in the front face portion 138 of the front housing member 134. A record button 146 is attached to the circuit board and protrudes through the first opening of the plurality of openings in the top edge portion of the front housing member. A GPS button 148 is attached to the circuit board and protrudes through the second opening of the plurality of openings in the top edge portion of the front housing member.

A speaker is attached to one of the circuit board and front housing member and is disposed to project sound through a fourth opening of the plurality of openings in said front face of said front housing member. A plurality of slats 150 extend laterally across the fourth opening of the front face forming a baffle.

A siren button 154 is attached to the circuit board and protrudes through an opening of the plurality of openings in the front housing member.

A microphone is attached to one of the circuit board and front housing member and is disposed to capture sound through a fifth opening of the plurality of openings in said front face of said front housing member. A plurality of slats 152 extend laterally across the fifth opening of the front face forming a baffle.

Operation of the present invention is believed to be apparent from the foregoing description and drawings, a few words will be added for emphasis. One end of the belt is fastened to the buckle and the belt is placed around the waist of the user. The distal end of the belt is slid through the buckle and the belt is adjusted to fit. When an emergency does not exist, a person can use the camera functions to record scenes and activity in real time. Sound recordings can also be made in real time. Similarly using the GPS button alone provides position information to be communicated to a person via the Wifi communications module. When an emergency condition exists, a person wearing the belt simply presses the panic button and automatically initiates audio and video recording, and starts the programmed numbers dialing. The panic button enables all functions of the device except the siren so that alerting and recording can be done discretely without sound. The siren is activated whenever the siren button is depressed.

It can now be appreciated that a personal emergency safety device has been presented that operates with the push of a single button to warn of an emergency problem situation. The device can be configured to be worn on the wrist or hanging from the neck as a pendant, but is best used as a discreet belt buckle. The device can be programmed to automatically call as many as three numbers with the calling sequence terminating when a called party answers. The programmed numbers can be parents, friends, a 911 emergency call center or other call center. Depressing the panic button automatically initiates the calling sequence and simultaneously enables audio and video recording.

While the invention has been described with particular reference to the preferred embodiments, it will be understood by those skilled in the art that various changes may be made and equivalents may be substituted for elements of the preferred embodiments without departing from invention. For example, the device described herein may be worn as a pendant around the neck or may be attached to a wristband.

As is evident from the foregoing description, certain aspects of the invention are not limited to the particular details of the examples illustrated, and it is therefore contemplated that other modifications and applications will occur to those skilled in the art. For example, any number of control modules other than those specifically enumerated herein could be used. Or, a cellular telephone could be adapted to provided one or more of the functions of the present invention. It is accordingly intended that the claims shall cover all such modifications and applications as do not depart from the true spirit and scope of the invention.

ELEMENT LIST 10 personal safety device
12, 14 front and rear housing members
16 circuit board
18 screws
20, 22 plurality of openings
24 front face
26-32 plurality of openings
34 power button
36 lens
38 panic button
40 record button
42 GPS button
44 USB port
46 first opening
48 dc jack
50 second opening
52 speaker
54 slats
56 microcontroller
58 GPS module
60 antenna
62 Wifi module
64 antenna
66 camera module
68 microphone
70 speaker
72 USB communications module
74 power controller
76 lithium ion battery
78 protection circuit
80 battery charger
82 linear regulator
84 flash memory
86 RAM memory
88 real time clock
90 system clock
92-96 LED's
98-102 debugging and programming modules
104 first buckle member
106 first portion
108 intermediate portion
110 third portion
112 vacant
114 hook
116 belt
118 second buckle member
120 first portion
122 intermediate portion
124 third portion
126 first spring
128 thumb latch
130 vertical spring member
132 personal emergency safety device
134 front housing member
136 rear housing member
138 front face
140 power button
147 lens
144 panic button
146 record button
148 GPS button
150 slats
152 slats
154 siren button

What is claimed is:

1. A personal safety device, comprising:
a housing having a front housing member and a rear housing member, said front housing member having a top edge portion with a plurality of openings therein, a bottom edge portion, and a front face disposed between said top and bottom edge portions, said front face having a plurality of openings therein, said rear housing member having top and bottom edge portions, left and right edge portions and a rear face;
a circuit board disposed in said housing and attached to said front housing member;
a power button attached to said circuit board and protruding through a first opening of said plurality of openings in said front face of said front housing member;
a lens disposed in a second opening of said plurality of openings in said front face portion of said front housing member;
a panic button attached to said circuit board and protruding through a third opening of said plurality of openings in said front face portion of said front housing member;
a first buckle member having a first portion, an intermediate portion and a third portion, said first portion being fastened to said rear face of said rear housing member and having a distal end portion, said intermediate portion having one end pivotally connected to said distal end portion, said third end portion being pivotally connected to said intermediate portion, said intermediate portion forming an opening with a hook therein adapted to grab and hold fast a first end portion of a belt, said third portion forming a loop adapted to hold a second end portion of said belt.

2. A personal safety device, as set forth in claim 1, including a record button attached to said circuit board and protruding through a first opening of said plurality of openings in said top edge portion of said front housing member.

3. A personal safety device, as set forth in claim 1, including a GPS button attached to said circuit board and protruding through a second opening of said plurality of openings in said top edge portion of said front housing member.

4. A personal safety device, as set forth in claim 1, wherein said bottom edge portion of said front housing member has a plurality of openings therein and including:
- a USB port attached to said circuit board and accessible through a first opening of said plurality of openings in said bottom edge portion of said front housing member; and
- a dc jack attached to said circuit board and accessible through a second opening of said plurality of openings in said bottom edge portion of said front housing member.

5. A personal safety device, as set forth in claim 1, including a speaker attached to one of said circuit board and front housing member and disposed to project sound through a fourth opening of said plurality of openings in said front face of said front housing member.

6. A personal safety device, as set forth in claim 5, including a plurality of slats extending laterally across said fourth opening of said front face forming a baffle.

7. A personal safety device, as set forth in claim 1, including:
- a second buckle member having a first, intermediate and third loop portions attached to said rear face adapted to receive a belt therethrough, said first loop portion having a first spring and a thumb latch attached thereto adapted to hold and release said belt in response to moving said thumb latch, said intermediate loop portion having a vertical spring member therein adapted to bias said first spring toward said belt.

8. A personal safety device, as set forth in claim 1 including a siren button attached to the circuit board and protruding through an opening of the plurality of openings in the top edge portion of the front housing member.

9. A personal safety device, comprising:
- a housing having a front housing member and a rear housing member, said front housing member having a top edge portion with a plurality of openings therein, a bottom edge portion, and a front face disposed between said top and bottom edge portions, said front face having a plurality of openings therein, said rear housing member having top and bottom edge portions, left and right edge portions and a rear face;
- a first buckle member having a first portion, an intermediate portion and a third portion, said first portion being fastened to said rear face of said rear housing member and having a distal end portion, said intermediate portion having one end pivotally connected to said distal end portion, said intermediate portion forming an opening with a hook therein adapted to grab and hold fast a first end portion of a belt, said third end portion being pivotally connected to said intermediate portion, said third portion forming a loop adapted to hold a second end portion of said belt;
- a second buckle member having a first, intermediate and third loop portions attached to said rear face adapted to receive said belt therethrough, said first loop portion having a first spring and a thumb latch attached thereto adapted to hold and release said belt in response to moving said thumb latch, said intermediate loop portion having vertical spring member therein adapted to bias said first spring toward said belt;
- a power button protruding through a first opening of said plurality of openings in said front face of said front housing member;
- a lens disposed in a second opening of said plurality of openings in said front face portion of said front housing member; and
- a panic button protruding through a third opening of said plurality of openings in said front face portion of said front housing member.

10. A personal safety device, as set forth in claim 9, including a record button protruding through a first opening of said plurality of openings in said top edge portion of said front housing member.

11. A personal safety device, as set forth in claim 9, including a fourth opening of said plurality of openings in said front face portion of said front housing member;
- a speaker attached to said front housing member and disposed to project sound through a fourth opening of said plurality of openings in said front face of said front housing member; and
- a plurality of slats extending laterally across said fourth opening of said front face forming a baffle.

12. A personal safety device, as set forth in claim 9 including a siren button attached protruding through an opening of the plurality of openings in the top edge portion of the front housing member.

* * * * *